United States Patent [19]

Coassolo et al.

[11] Patent Number: 4,904,757
[45] Date of Patent: Feb. 27, 1990

[54] POLYESTERS OF 4,4'DIHYDROXYBICYCLOHEXYL

[75] Inventors: Alfredo Coassolo, Novara; Andrea Gardano, Trino; Marco Foa', Novara; L. Lawrence Chapoy, Lesa, all of Italy

[73] Assignee: Montedison S.p.A., Milan, Italy

[21] Appl. No.: 221,745

[22] Filed: Jul. 20, 1988

[30] Foreign Application Priority Data

Jul. 23, 1987 [IT]  Italy ................................ 21402 A/87

[51] Int. Cl.$^4$ ............................................ C08G 63/02
[52] U.S. Cl. .................................... 528/272; 528/297; 528/300; 528/308; 528/392
[58] Field of Search ............... 528/272, 297, 300, 308, 528/392; 525/437

[56] References Cited

U.S. PATENT DOCUMENTS 4,342,862  8/1982  Jackson et al. ...................... 528/176
4,822,827  4/1989  Bonk et al. ............................ 521/170
4,835,228  5/1989  Hefner, Jr. et al. .................. 525/524

OTHER PUBLICATIONS

Osman, Maged "Thermotropic Liquid Crystalline Polymers with Quasi-Rigid Chains, 1, Cyclohexyl Moeities", Macromolecules, 19, 1986, 1824–1827.

Primary Examiner—John Kight
Assistant Examiner—Samuel A. Acquah
Attorney, Agent, or Firm—Stevens, Davis, Miller & Mosher

[57] ABSTRACT

Thermotropic semiflexible polyesters are taught which are obtained by polycondensation of 4,4'-dihydroxybicyclohexyl with at least one $\alpha,\omega$- alkandioic acid of general formula:

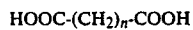

$$\text{HOOC-(CH}_2)_n\text{-COOH} \qquad (I)$$

wherein n is an integer comprised between 4 and 12.

10 Claims, No Drawings

POLYESTERS OF 4,4'DIHYDROXYBICYCLOHEXYL

FIELD OF THE INVENTION

The present invention relates to polyesters of 4,4'-dihydroxybicyclohexyl.

More particularly, the present invention relates to semiflexible thermotropic polyesters of 4,4'-dihydroxybicyclohexyl which can be easily processed in the molten state and which contain a mesogen unit and a flexible unit in alternate sequence.

BACKGROUND OF THE INVENTION

As known, thermotropic liquid crystal polymers containing a cyclohexyl unit are described in numerous examples in the literature.

Generally, the cyclohexylic unit is derived either from 1,4-cyclohexandicarboxylic acid or from 1,4-cyclohexandiol.

In U.S. Pat. No. 4,342,862, polyesters are derived from polycondensation of an acidic mixture containing trans-1,4-cyclohexandicarboxylic acid and other aromatic diacids with substituted hydroquinones such as methyl, phenyl and chloro hydroquinones.

The preparation of thermotropic liquid crystal polyesters by polycondensation of the only trans-cyclohexandicarboxylic acid with some of the above mentioned substituted hydroquinones is described in "Macromolecules", vol. 19, p. 1824 (1986).

Polyesters of trans-1,4-cyclohexandiol with substituted aromatic diacids or alternatively polyesters derived from mixtures of cis and trans isomers of 1,4-cyclohexandiol with aromatic or cycloaliphatic diacids are described in the same article.

Other thermotropic liquid crystal polymers containing a cyclohehexane unit are the block copolyesters described in "Macromolecules", vol. 14, p. 1626 (1981), such as for instance polyoxy-trans-1,4-cyclohexylenoxycarbonyl-trans-1,4-cyclohexylencarbonyl-oxy-1,4-phenylenoxyphthaloyl or the copolymers described in "Makromolecular Chemie 187", p. 1145 (1986), wherein the rigid structure of trans-1,4,cyclohexanedibenzoate is polycondensed with α,ω-alkandioic acids.

All the preceding references are hereby incorporated by reference.

SUMMARY OF THE INVENTION

A new class of polyesters has been discovered containing the 4,4'-dihydroxybicyclohexyl as a repeating unit. Moreover, it has been found that when the 4,4'-dihydroxybicyclohexyl is used in the trans-trans isomeric form, polyesters are thermotropic products and therefore, optically anisotropic in the molten state.

DETAILED DESCRIPTION OF THE INVENTION

Therefore, an object of the present invention are the polyesters obtained by polycondensation of 4,4'-dihydroxybicyclohexyl with at least one α,ω-alkandioic acid of general formula:

HOOC—(CH$_2$)$_n$—COOH    (I)

wherein n is an integer from 4 to 12, or at least one alkyl derivative thereof having a chiral carbon atom wherein the alkyl radical contains from 1 to 6 carbon atoms.

Semiflexible thermotropic polyesters obtained by polycondensation of 4,4'-dihydroxybicyclohexyl, essentially in its trans-trans form, with at least one α,ω-alkandioic acid of general formula:

HOOC—(CH$_2$)$_n$—COOH    (I)

wherein n is an integer from 4 to 12, or at least one alkyl derivative thereof having a chiral carbon atom wherein the alkyl radical contains from 1 to 6 carbon atoms, are a further object of the present invention.

Examples of alkandioic acids and alkyl derivatives thereof are sebacic acid, pimelic acid, suberic acid, azelaic acid, 1,10-bicarbossildecane acid, 1,12-bicarboxyldodecane acid, 3-methyladipic acid, 3-ter-butyl-adipic acid, etc.

According to a preferred embodiment of the thermotropic polyesters of the present invention, 4,4'-dihydroxybicyclohexyl is present for at least 90%, and more preferably for at least 95% in the trans-trans isomeric form.

The thermotropic polyesters of the present invention are optically anisotropic in the molten state. As it is possible to ascertain by optical microscopy analysis with polarized light, they have a melting point between 170° and 275° C., inherent viscosity, measured in 60:40 phenoltetrachloroethane mixture at 30° C. at a concentration of 2.5 g/l, between 0.4 and 1.8 and anisotropization temperatures of the molten product between 170° and 310° C.

Furthermore, these polymers are endowed with high crystallinity, above 30% by volume and generally between 40 and 60%. They show characteristics of good thermal stability.

Molecular weight and crystallinity can be increased by heating the particles of the polymer in inert atmosphere or in vacuum at temperatures very little below the melting point for a time varying from 1 to 20 hours.

Polymers of the present invention are fit for obtaining shaped articles which can be prepared by the commonly used techniques for the transformation of thermoplastic polymers, such as injection molding or extrusion, can be processed as films or fiber, or can be used as matrix for composite materials based on inorganic fibers or fillers.

The possibility to vary within specified limits the melting temperature, by selecting suitably the diacid or the mixture of carboxylic diacids, make the polymers of the present invention particularly useful for the preparation of mixtures with a series of known polymers such as polyethylene, polypropylene, polyvinylchloride, polystyrenes, polymethylmethacrylate, ABS, polyamides, polycarbonates, polyarylates, polyesters such as polyethyleneterphthalate or polybutyleneterephalate, polyphenyleneoxides, etc.

Any polymerization technique can be used for preparation of the polymers of the present invention. However, solution polymerization is the preferred technique.

According to this technique, the halides of alkandioic diacids, obtained by known techniques, or the mixture of dihalides, are added to the 4,4'-dihydroxybicyclohexyl in molar ratio 1:1 in a suitable solvent. Preferred solvents are chlorinated solvents either aliphatic or aromatics such as methylene chloride, chlorobenzene and di-and tri-chloro benzenes.

The reaction temperature depends of the solvent used and generally is between 25° and 220° C. The reaction is generally carried out under nitrogen stream and/or in the presence of a base to make easier the removal of the halogenated acid. The preferred base is pyridine.

The thus obtained polymer is then recovered by evaporation of the solvent or by precipitation with a suitable nonsolvent, such as acetone, and successive filtration and washing.

Diacids used for polymerization are products available on the market whereas 4,4'-dihydroxybicyclohexyl can be prepared according to the process described in Italian patent application No. 20368 A/87, hereby incorporated by reference, by hydrogenation of the corresponding bisphenol in the presence of a catalytic system consisting of palladium on activated carbon having a specific surface lower than 1000 m$^2$/g. The hydrogenation can occur in bulk or in a solvent optionally added with water, at a reaction temperature between 80° and 160° C. and a hydrogen pressure between 50 and 150 atm.

The thus obtained diol can be successively enriched in the trans-trans isomeric form by crystallizing this last from the mixture with other cis-cis and cis-trans isomers by means of chloroform.

EXAMPLES

To better understand the present invention and to practically perform the same, some illustrative, but not limitative examples are reported hereinafter.

EXAMPLE 1

Into a four-necked glass round-bottomed flask provided with mechanical agitator, cooler and inlet pipe for nitrogen, 2.46 g (12.42 mM) of 4,4'-dihydroxybicyclohexyl with a trans-trans isomer titre higher than 99%, 2.97 g (12.42 mM) of dichloride of the sebacic acid and 60 ml of 1,2,4-trichlorobenzene are introduced.

The mixture is kept under agitation and nitrogen stream for 15 minutes at room temperature. Thereafter heating is begun. The temperature is raised up to 220° C. by means of a silicon oil bath.

The whole is kept at this temperature for 3 hours, until the release of HCl is practically completed.

The mixture is permitted to cool, always under agitation and nitrogen steam, to 50° C. It is then poured in acetone. The precipitate is filtered off.

The thus obtained polymer is washed with acetone (twice), hot water (twice) and acetone/methanol (twice).

The finished product is dried under vacuum for 2 hours at 160° C.

The dried polymer has a melting temperature (Tm) of about 212° C., an isotropization temperature (Ti) of 271° C., an inherent viscosity of 1.33 (measured at the temperature of 30° C. in a solvent consisting of a 60:40 mixture of phenol and tetrachloroethane at the concentration of 2.5 g/l and a crystallinity of 45% by volume.

The melting temperature and the isotropization temperature are measured at DSC (Differential Scanning Calorimetry) with a scanning of 20° C./min.

The polymer is optically anisotropic by microscopy with polarized light in the range of temperature between the Tm and the Ti.

EXAMPLES 2-6

Other polyesters are prepared according to the modalities and molar quantities of example 1.

Results are listed in the following table.

All these polymers are optically anisotropic in the temperature range between the melting temperature (Tm) and the isotropization temperature (Ti).

| Example | (b) | Crystallinity % by volume | Inherent Viscosity | Melting Temp. Tm/°C. | Isotropization Temperature Ti/°C. |
|---|---|---|---|---|---|
| 2 | $b_5$ | 49 | 1.46 | 216 | 305 |
| 3 | $b_6$ | 52 | 1.40 | 215 | 288 |
| 4 | $b_7$ | 49 | 0.96 | 180 | 269 |
| 5 | $b_{10}$ | 51 | 0.76 | 208 | 247 |
| 6 | $b_{12}$ | 52 | 1.40 | 204 | 225 |

The inherent viscosity is measured at the temperature of 30° C. in a solvent consisting of a 60:40 mixture of phenol and tetrachloroethane at the concentration of 2.5 g/l whereas Tm and Ti are measured at DSC (Differential Scanning Calorimetry) with a scanning of 20° C./minute.

EXAMPLE 7

Into a four-necked round bottomed flask of the capacity of 100 ml, provided with mechanical agitator, cooler and nitrogen inlet pipe, under a slight nitrogen stream, 0.99 g (5 mM) of trans-trans 4,4'-dihydroxybicylohexyl with a purity degree higher than 99%, 0.597 (2.5 mM) of dichloride of the sebacic acid, 0.668 g (2.5 mM) of dichloride of the 1,10-bicarboxyldecane acid and 40 ml of 1,2,4-trichloro benzene are introduced.

The mixture is kept under agitation and under nitrogen stream for 15 minutes at room temperature. Thereafter, heating is begun until the temperature reaches 220° C. by means of a silicon oil bath.

The mixture is kept at this temperature for 3 hours until the release of HCl is practically completed. At the end of the polymerization, the solution is clear and very thick, Always under nitrogen stream and agitation, the oil bath is removed. The mixture is permitted to cool. When the reaction mixture is at 50° C., it is poured into acetone. The precipitate is filtered off.

The thus obtained polymer is washed with acetone (twice), with hot water (twice) and with acetone/methanol (twice).

The final product is dried under vacuum for 2 hours at 160° C.

The dried polymer has a melting temperature (Tm) of 179° C., an isotropization temperature (Ti) of 256° C., an inherent viscosity of 0.95 and a crystallinity of 65% by volume.

The polymer is optically anisotropic at the microscope with polarized light in the temperature range between the Tm and Ti.

EXAMPLE 8

By the same working modalities of example 1, the following quantities are introduced:
1.08 g (5.45 mM) of 4,4'-dihydroxybicyclohexyl having the following isomeric composition:
 93.6% of trans-trans isomer
 5.85% of cis-trans isomer
 0.55% of cis-cis isomer
1.303 g (5.45 mM) of dichloride of sebacic acid and 40 ml of 1,2,4-trichlorobenzene.

The dried polymer has a melting temperature (Tm) of 205° C., an isotropization temperature (Ti) of 254° C., an inherent viscosity of 0.81 and a crystallinity of 53% by volume.

The polymer is optically anisotropic at the microscope with polymerized light in the temperature range between the Tm and Ti.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Polyesters obtained by polycondensation of 4,4'-dihydroxybicyclohexyl with at least an α,ω-alkandioic acid of the general formula:

$$HOOC-(CH_2)_n-COOH \quad (I)$$

wherein n is an integer from 4 to 12, or at least one alkyl derivative thereof having chiral carbon atom wherein the alkyl radical contains from 1 to 6 carbon atoms.

2. Semiflexible thermotropic polyesters obtained by polycondensation of 4,4'-dihydroxybicyclohexyl, essentially in its trans-trans isomeric form, with at least an α,ω-alkandioc acid of general formula:

$$HOOC-(CH_2)_n-COOH \quad (I)$$

wherein n is an integer from 4 to 12, or at least one derivative thereof having a chiral carbon atom wherein the alkyl radical contains from 1 to 6 carbon atoms.

3. Polyesters according to claim 1, wherein the alkandioc acids and their alkyl derivatives are sebacic acid, pimelic acid, suberic acid, azelaic acid, 1,10-bicarboxyldecane acid, 1,12-bicarboxyldodecane acid, 3-methyladipic acid, and 3-ter-butyl-adipic acid.

4. Polyesters according to claim 2, wherein the 4,4'-dihydroxybicylohexyl is at least 90% in the trans-trans isomeric form.

5. Polyesters according to claim 2, wherein the 4,4'-dihydroxybicylohexyl is at least 95% in the trans-trans isomeric form.

6. Polyesters according to claim 2, wherein the polyesters having a melting point between 170° and 275° C., inherent viscosity measured in 60:40 phenol-tetrachloroethane mixture, at 30° C., at the concentration of 2.5 g/l, between 0.4 and 1.8 and anisotropization temperatures of the molten product between 170° and 310° C.

7. Polyesters according to claim 2, wherein the polyesters have a crystallinity higher than 30% by volume.

8. Polyesters according to claim 7, wherein the polyesters have a crystallinity between 40 and 60% by volume.

9. Use of polyesters described in claim 2 for obtaining shaped articles, injection molded or extruded, or as matrix for composite materials based on fibers or inorganic fillers.

10. Use of polyesters described in claim 1 in mixture with polyethylene, polypropylene, polyvinylchloride, polystyrenes, polymethacrylate, ABS, polyamides, polycarbonates, polyarylates, polyesters such as polyethyleneterephthalate or polybutyleneterephthalate, or polyphenylenoxides.

* * * * *